UNITED STATES PATENT OFFICE.

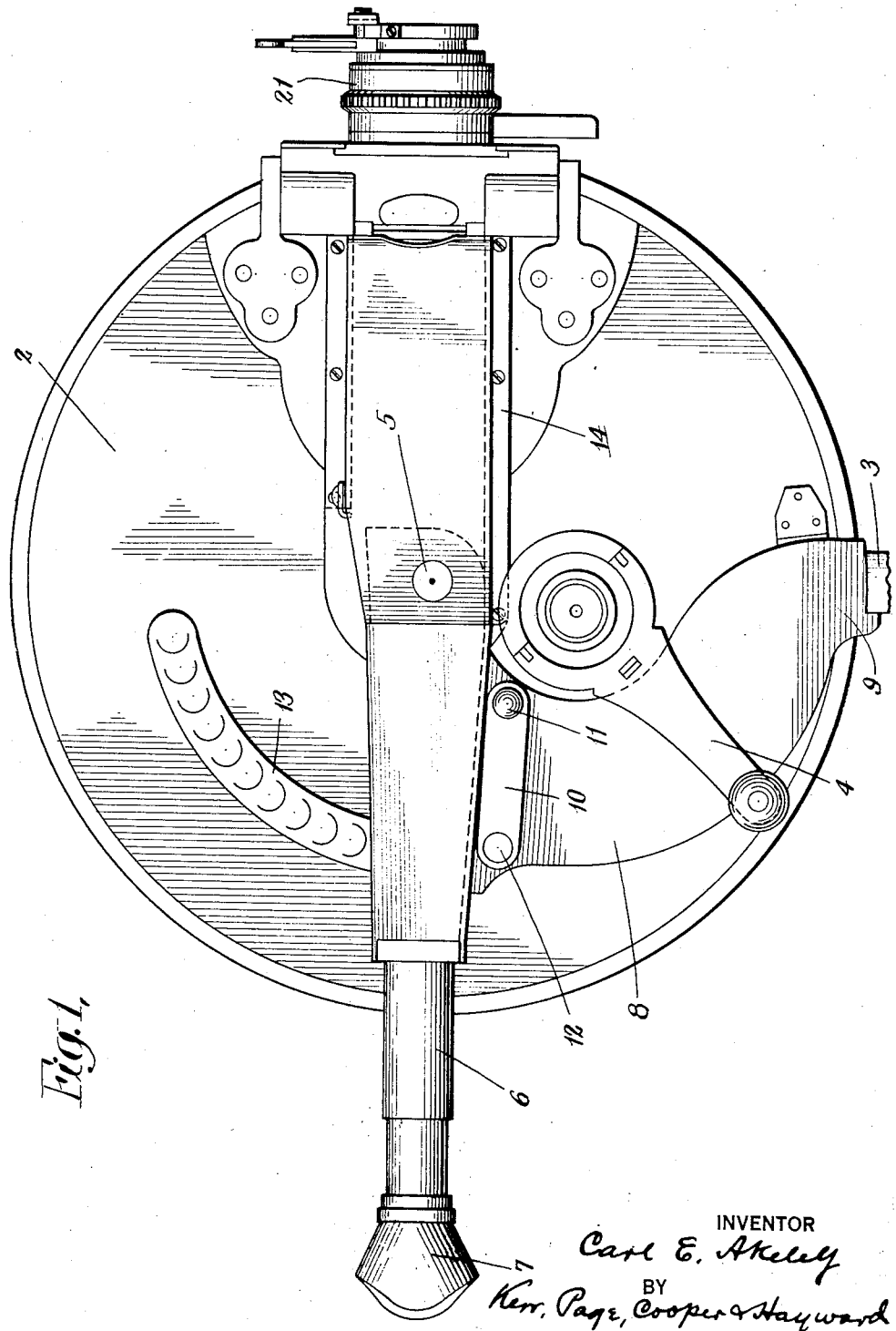

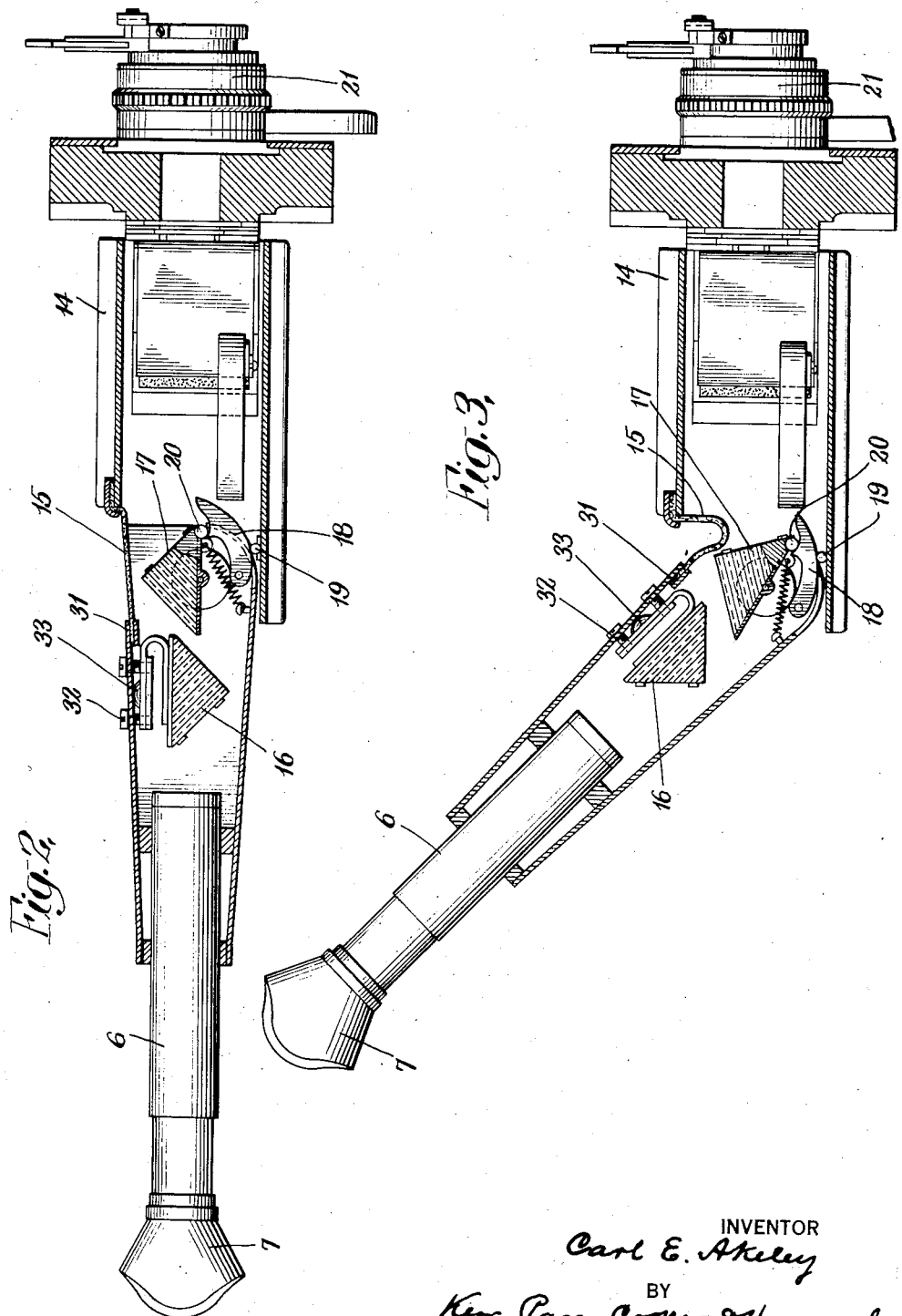

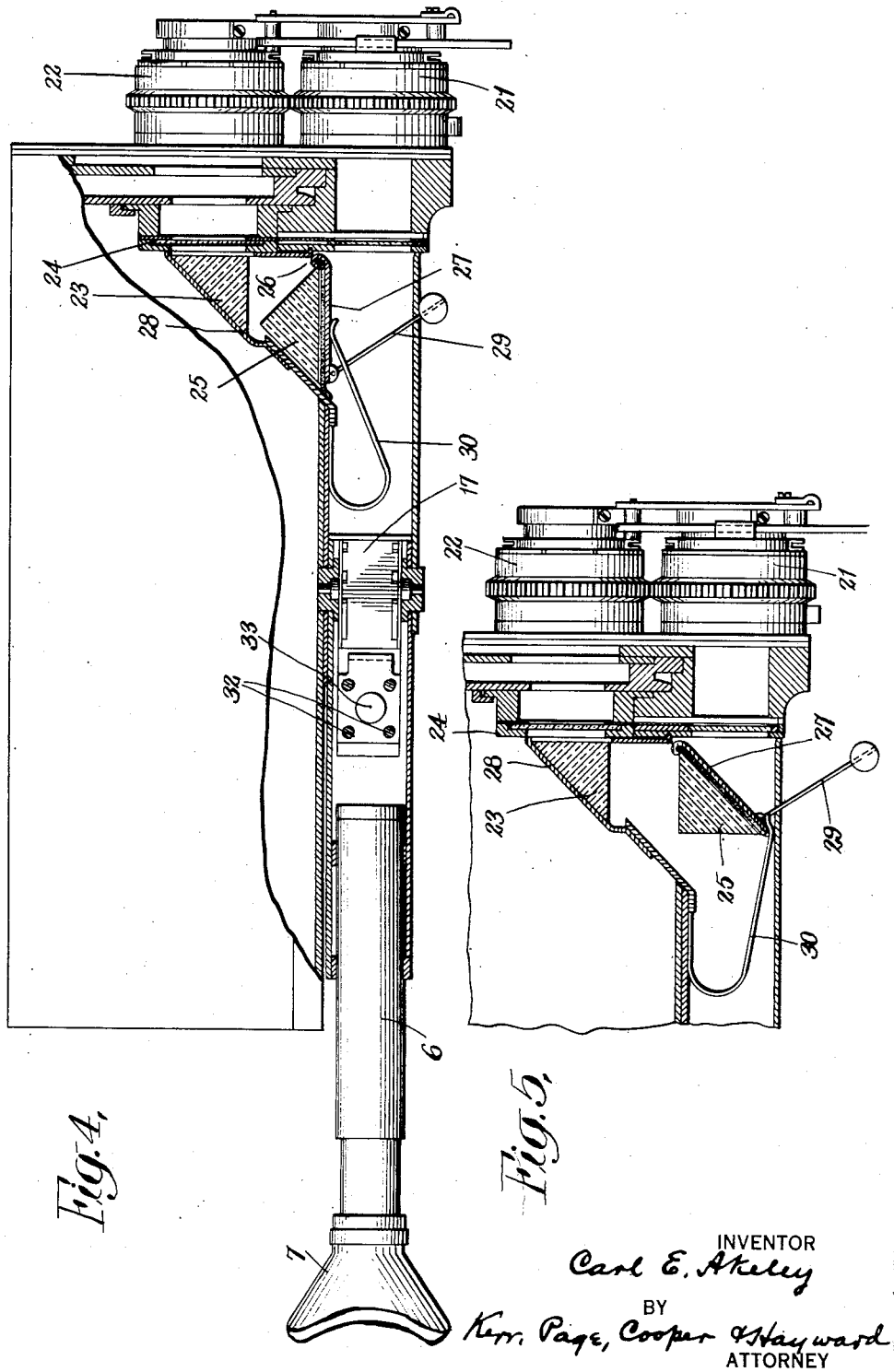

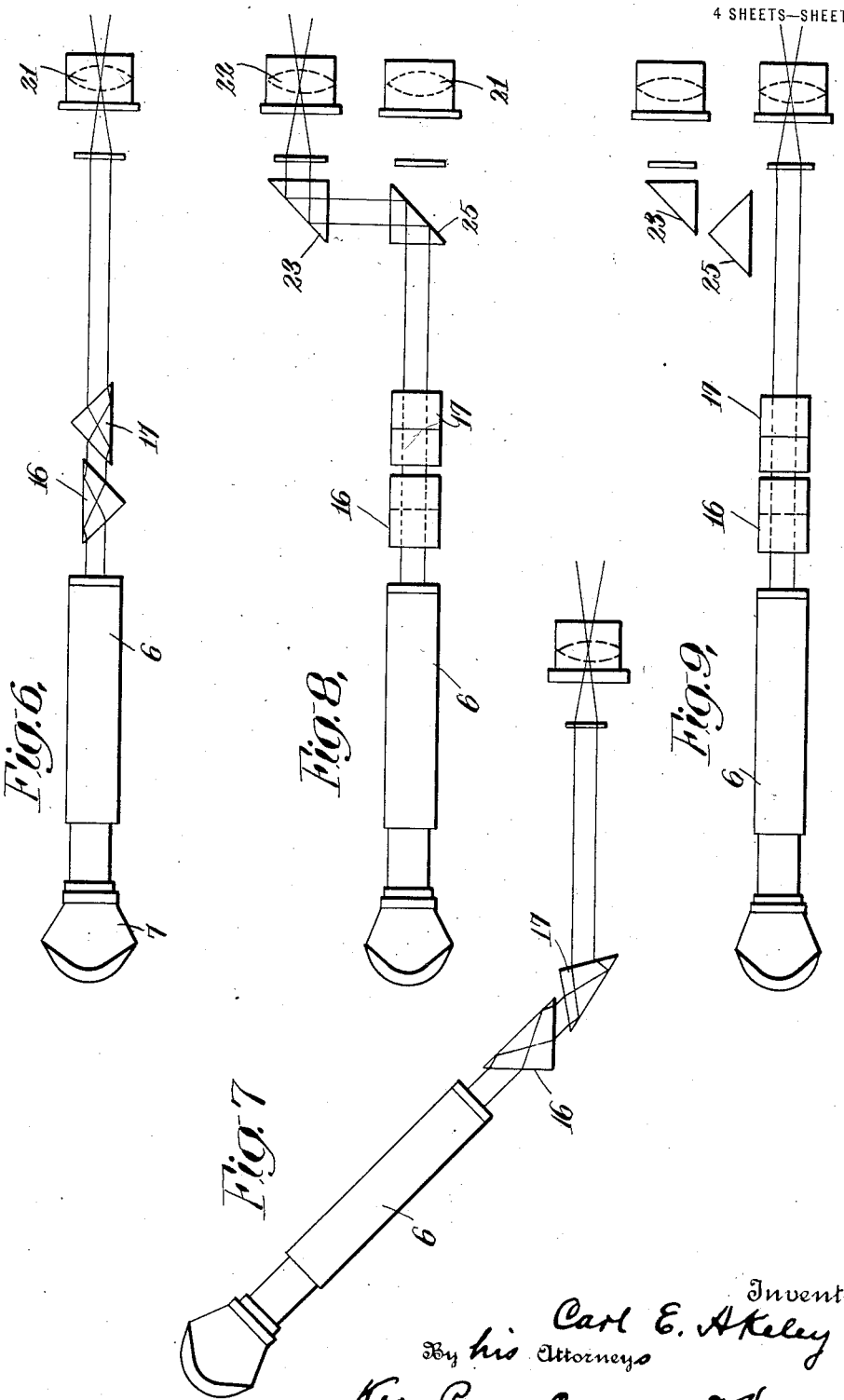

CARL E. AKELEY, OF NEW YORK, N. Y., ASSIGNOR TO AKELEY CAMERA INC., OF NEW YORK, N. Y., A CORPORATION.

FINDER FOR MOVING-PICTURE CAMERAS.

1,310,776.      Specification of Letters Patent.      Patented July 22, 1919.

Application filed July 23, 1918. Serial No. 246,280.

*To all whom it may concern:*

Be it known that I, CARL E. AKELEY, a citizen of the United States, residing at New York, county and State of New York, have invented certain new and useful Improvements in Finders for Moving-Picture Cameras, of which the following is a full, clear, and exact description.

The invention, subject of this application for Letters Patent is an improvement in finders for moving picture cameras, and its nature, purpose and function may be most readily comprehended from the following considerations.

In the ordinary use of instruments of this description a finder lens that throws the image on a ground glass plate is usually sufficient for all practical purposes, but under certain and more exacting conditions, such simple means are totally inadequate to accomplish the desired results. If, for example, the camera is to be used for securing pictures of a bird in flight or of an aeroplane or other object moving through otherwise vacant space, the camera itself must not only be capable of universal movement about a fixed support, but a finder is very necessary which is substantially stationary with reference to the eye of the operator and which will reproduce the photographed object so that it may always be readily maintained in the proper relation to the field of vision or of the objective lens.

For this purpose I have equipped my camera, which is capable of being steadily moved vertically when being operated, with a finder eye-piece, and a finder lens of the same character as the main objective, and I so construct the tube or passage for the rays between the two that the lens-carrying portion is movable with respect to the stationary eye-piece, the latter part being provided with a fixed and an adjustable prism whereby the light rays through the finder lens will at all times be directed to the eye, in all positions of the camera and to whatever point the objective lens may be directed.

By this means any object moving through space may be readily kept in proper position in the field of the finder, and in a corresponding position in the photographic field, with the least possible difficulty, as the eye-piece is subjected to but slight movement and that horizontally only, and the object, whether overhead or below the operator, may be kept in view without any material change in the latter's position.

The improvement is illustrated in the accompanying drawings in which—

Figure 1 is a view in side elevation of a camera with the improved finder attached thereto.

Fig. 2 is a longitudinal cross section of the finder tube with the finder lens attached to the same.

Fig. 3 is a similar view showing the two parts of the finder in a different angular relation.

Fig. 4 is a view mainly in section exhibiting an attachment to the finder for adjusting the objective.

Fig. 5 is an enlarged sectional view of the prisms pertaining to such attachment in different relative positions.

Figs. 6, 7, 8 and 9 are diagrammatic illustrations of the optical principles involved in the device, showing the modes of operation.

Fig. 1 illustrates sufficiently for purposes of this case the camera which I contemplate using and the manner of attaching the finder to the same. The numeral 2 indicates the cylindrical camera casing which is movable in both a vertical and a horizontal plane with reference to the fixed support which may be regarded as indicated by the post or part 3. The handle for feeding the film and operating the camera is marked 4.

At the point 5 is pivoted concentrically with the axis of the camera a sight tube 6 having a suitable eye-piece 7, the said tube being rigid with a plate or part 8 which has its free end 9 in contact with the part 3 at any part of the camera stand or base so that it cannot be further turned in that direction.

10 is a resilient plate secured to the part 8 at 11 and having a stud 12 passing through a corresponding hole in plate 8 and adapted to engage with semi-circular depressions in an arc-shaped bar 13, secured to the side of the camera and constituting a ratchet and forming a semi-positive lock therewith.

The forward or lens-carrying portion of the finder attachment 14 (see Figs. 2 and 3) is secured to the side of the camera and extends under the other part and is connected to its upper side by a strip of leather 15, or other flexible connection, so that when the camera is turned in a vertical plane the angle between the two parts of the finder may be varied at will. This is clearly shown in the figures under consideration.

In the rear or normally stationary part of the sight tube 6 is a fixed prism 16 and supported concentrically with the pivotal point 5 is a revoluble prism 17. To one side of the tube 6 is pivoted a cam lever 18, having a rounded surface that bears upon a stud or pin 19 set in the lens-carrying tube 14, and the upper edge of this lever is properly fashioned to engage with a pin 20 on the support for prism 17, so that as the part 14 moves relatively to the part 6 the prism 17 is turned about its axis to receive the light rays from the finder lens 21, and direct them at changing angles through the prism 16 and directly to the eye-piece 7 or axially through the section 6 of the finder tube. The stationary prism is preferably carried by an arm 31 attached to an opaque backing which in turn is mounted on the side wall of section 6 by four screws 32 passing through the latter and holding the spring against a rounded point 33. This accords a ready and convenient means of adjusting the prism to exactly its proper position.

The optical principles involved in this operation are well understood, but for convenience they are illustrated diagrammatically in Figs. 6 and 7. In the former of these figures the two parts of the sight tubes are in exact alinement and the lines indicate the path of the rays through the finder lens 21 through the two prisms to the eye-piece 7. In Fig. 7, on the contrary, where the angle between the two parts 6 and 14 is less than 180° the rays reaching the prism 17 are deflected to prism 16 and thence transmitted to the eye-piece.

The use of the device involves no difficulties or complications. The normal position of the camera and its attachment is shown in Fig. 1. The two parts of the sight tube are in alinement, and the plate 8 in engagement with the part 3. These relations are not changed unless the objective lens is moved upward from the horizontal, when the stud 12 slips over the indentations in the ratchet bar 13 and the other operations above set forth take place.

Assume, however, that the operator is in an elevated position and desires to photograph objects below or beneath him. In such case he turns the camera through a greater or less angle and brings the eye-piece as near the vertical as need be when it will be locked by the stud 12 against downward movement. By then looking down into the eye-piece an object may be followed from a point nearly vertically below to a point horizontally in front, as the necessary movement of the camera is permitted by the ratchet bar 13 without any change in the position of the eye-piece. It will be understood that if the camera is to be moved in the direction which is normally opposed by the ratchet 13 the stud 12 may be lifted to permit this to be done without difficulty.

Another feature of improvement which characterizes this device is a means for securing a direct view of that portion of the film upon which the image is cast by the objective or generally of such image, in order to determine more perfectly the light effects, and adjustment of the apertures and the like. For this purpose a prism 23 is placed opposite an opening in and immediately back of the passage 24 through which the film is fed in the field of exposure, and this prism receives the rays of the image directly from and through the objective lens 22 and directs them horizontally at right angles.

Beside the prism 23 is another prism 25 pivoted at one corner 26 and having an opaque backing 27, which normally constitutes a light-proof closure for a chamber 28 back of the field of exposure. When it is so desired a rod 29 extending out through the tube 14 and attached at its inner end to the opaque backing of the prism 25 is drawn out and this swings the prism on its pivotal support to the position shown in Fig. 5 against the force of a spring 30. When in this position the prism locks the spring under tension and the light rays which it receives from the prism 25 are directed axially through the sight tube to the eye-piece.

By this means the image as projected upon the film may be inspected with no appreciable damage to the film by light, and the apertures or other parts adjusted accordingly. When this examination has been made the prism 25 is forced back by the rod 29 and the light-tight compartment 28 back of the field of exposure effectively closed and sealed. The optical result of shifting the position of the lens 25 for this purpose is shown in the diagram of Figs. 8 and 9 which are self-explanatory.

A camera equipped with this invention is capable of use under all imaginable conditions with the minimum of trouble and difficulty. An aeroplane may be photographed in flight from a trench, a street scene may be photographed from a window, or similar operations performed without requiring the operator to assume inconvenient and difficult attitudes for the purpose of keeping the objects photographed in the center of the field of vision.

What I claim is:—

1. The combination with a motion picture camera movable in a vertical plane about a fixed point of support of a finder tube composed of two sections one stationary and the other movable with the camera, and means therein for deflecting the light rays from and through the finder lens at angles varying with the vertical displacement of the two sections relatively to each other and axially through the stationary section.

2. The combination with a moving picture camera capable of movement in a vertical plane about a fixed point of support of a finder tube composed of two sections one stationary the other movable with the camera, and a fixed prism and an adjustable prism in the stationary section to direct the light rays from the finder lens in the movable section at angles corresponding to the relative vertical displacement of the two sections and axially through the stationary section.

3. The combination with a moving picture camera capable of movement in a vertical plane with reference to a fixed point of support, of a finder tube composed of a stationary section and a section movable with the camera, a stationary prism and a movable prism in the stationary section, and means dependent upon the relative movement of the two sections for turning the movable prism so that the light rays received by it through the movable section from the finder lens therein will be deflected at all times axially through the stationary section.

4. The combination with a moving picture camera capable of movement in a vertical plane with reference to a fixed point of support, of a finder tube composed of a section normally stationary but capable of adjustment in a vertical plane, and a section flexibly connected therewith but movable with the camera, a stationary prism mounted in the first-named section, a rotatable prism also mounted therein and means for turning the rotatable prism in proportion to the relative vertical displacement of the two sections, whereby the light rays received by it from the finder lens and through the movable section will be deflected at corresponding angles axially through the stationary section.

5. The combination with a moving picture camera of a finder lens and tube and an objective lens, a stationary prism back of an opening in the film guide and field of exposure, a pivoted prism normally closing light-tight a compartment containing the stationary prism and means for shifting the same into the finder tube whereby the rays of light received by the stationary prism through the objective lens will be directed upon the pivoted prism and by the other deflected axially through the finder tube.

In testimony whereof I affix my signature.

CARL E. AKELEY.